(12) United States Patent
Naganuma

(10) Patent No.: US 11,244,675 B2
(45) Date of Patent: Feb. 8, 2022

(54) WORD REPLACEMENT IN OUTPUT GENERATION FOR DETECTED INTENT BY VOICE CLASSIFICATION

(71) Applicant: JVC KENWOOD Corporation, Yokohama (JP)

(72) Inventor: Tatsumi Naganuma, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 152 days.

(21) Appl. No.: 16/295,034

(22) Filed: Mar. 7, 2019

(65) Prior Publication Data

US 2019/0279631 A1   Sep. 12, 2019

(30) Foreign Application Priority Data

Mar. 12, 2018   (JP) .............................. JP2018-044598

(51) Int. Cl.
| | |
|---|---|
| *G10L 17/06* | (2013.01) |
| *G06F 40/247* | (2020.01) |
| *G10L 15/22* | (2006.01) |
| *G10L 15/18* | (2013.01) |
| *G06F 3/16* | (2006.01) |
| *G10L 25/51* | (2013.01) |

(52) U.S. Cl.
CPC .............. *G10L 15/22* (2013.01); *G06F 3/167* (2013.01); *G10L 15/1815* (2013.01); *G10L 25/51* (2013.01); *G10L 2015/223* (2013.01)

(58) Field of Classification Search
CPC .... G06F 40/237; G06F 40/247; G06F 40/279; G06F 40/284; G10L 13/033; G10L 15/1822; G10L 15/22; G10L 25/63; G10L 2015/226; G10L 2015/228; G10L 17/00; G10L 17/06
USPC ......... 704/1, 9, 10, 231, 246, 239, 270, 275, 704/238
See application file for complete search history.

(56) References Cited

U.S. PATENT DOCUMENTS 5,852,804 A    12/1998  Sako
10,341,825 B2*  7/2019  Dowlatkhah ........... G10L 13/08
(Continued)

FOREIGN PATENT DOCUMENTS

JP   04-204700    7/1992
WO  2016/136062   9/2016

*Primary Examiner* — Martin Lerner
(74) *Attorney, Agent, or Firm* — Amin, Turocy & Watson, LLP

(57) ABSTRACT

An output-content control device includes a voice classifying unit configured to analyze a voice spoken by a user and acquired by a voice acquiring unit to determine whether the voice is a predetermined voice; an intention analyzing unit configured to analyze the voice acquired by the voice acquiring unit to detect intention information indicating what kind of information is wished to be acquired by the user; a notification-information acquiring unit configured to acquire notification information to be notified to the user based on the intention information; and an output-content generating unit configured to generate an output sentence as sentence data to be output to the user based on the notification information and also configured to generate the output sentence in which at least one word selected among words included in the notification information is replaced with another word when the voice is determined to be the predetermined voice.

7 Claims, 6 Drawing Sheets

(56) References Cited

U.S. PATENT DOCUMENTS

| | | | |
|---|---|---|---|
| 10,706,846 B1* | 7/2020 | Barton | G10L 15/1815 |
| 10,733,989 B2* | 8/2020 | Yehuday | G10L 15/22 |
| 2001/0041977 A1* | 11/2001 | Aoyagi | G10L 15/22 |
| | | | 704/246 |
| 2009/0234639 A1* | 9/2009 | Teague | G06F 40/56 |
| | | | 704/270.1 |
| 2011/0184721 A1* | 7/2011 | Subramanian | G10L 19/0018 |
| | | | 704/4 |
| 2014/0309999 A1* | 10/2014 | Basson | G10L 25/00 |
| | | | 704/270 |
| 2014/0330560 A1* | 11/2014 | Venkatesha | G10L 15/22 |
| | | | 704/275 |
| 2015/0331665 A1* | 11/2015 | Ishii | G10L 15/30 |
| | | | 715/728 |
| 2015/0332674 A1* | 11/2015 | Nishino | G10L 17/00 |
| | | | 704/246 |
| 2017/0025121 A1* | 1/2017 | Tang | G10L 17/06 |
| 2017/0256252 A1* | 9/2017 | Christian | G10L 13/027 |
| 2017/0337921 A1* | 11/2017 | Aoyama | G10L 15/26 |
| 2017/0351487 A1* | 12/2017 | Vaquero | G10L 17/00 |
| 2017/0364310 A1* | 12/2017 | Endo | G10L 17/26 |
| 2017/0366662 A1* | 12/2017 | Schuster | G10L 25/24 |
| 2018/0047201 A1* | 2/2018 | Filev | G06F 3/011 |
| 2018/0114159 A1* | 4/2018 | Dubey | G06F 15/16 |
| 2019/0103127 A1* | 4/2019 | Tseretopoulos | G06F 40/247 |
| 2019/0115008 A1* | 4/2019 | Jiang | G10L 15/22 |
| 2019/0121842 A1* | 4/2019 | Catalano | G06F 40/253 |
| 2019/0279611 A1* | 9/2019 | Naganuma | G10L 15/22 |
| 2019/0279631 A1* | 9/2019 | Naganuma | G10L 15/22 |
| 2020/0013401 A1* | 1/2020 | Saito | G10L 15/22 |

\* cited by examiner

FIG.3

| INTENTION INFORMATION I | SCHEDULE |

FIG.4

| ATTRIBUTE TYPE INFORMATION E0 | PERSON | DATE |
|---|---|---|
| ATTRIBUTE CONTENT INFORMATION E1 | MR. YAMADA | MARCH 20, 2020 |

FIG.5

| ACQUISITION TYPE INFORMATION A0 | LOCATION | TIME | WHAT TO DO | PERSON |
|---|---|---|---|---|
| ACQUISITION CONTENT INFORMATION A1 | TOKYO BUILDING | FROM 15 O'CLOCK | MEETING | MR. YOSHIDA |

FIG.6

| WORD TO BE REPLACED | MEETING | DINNER |
|---|---|---|
| REPLACING WORD | HOSPITAL VISIT | MEETING |

WORD REPLACEMENT IN OUTPUT GENERATION FOR DETECTED INTENT BY VOICE CLASSIFICATION

CROSS-REFERENCE TO RELATED APPLICATION

This application claims priority from Japanese Application No. 2018-044598, filed on Mar. 12, 2018, the contents of which are incorporated by reference herein in its entirety.

FIELD

The present application relates to an output-content control device, an output-content control method, and a non-transitory storage medium.

BACKGROUND

For example, as described in Japanese Examined Patent Application Publication No. H07-109560, voice control devices that analyze detected voice of a user and perform a processing according to an intention of the user have been disclosed. Moreover, voice control devices that output notification indicating that a processing intended by a user has been performed in voice, or that output an inquiry from a user in voice have also been disclosed.

When a voice processing device that outputs voice is used, there is a case in which a notification from the voice control device in response to an inquiry of a user is heard by people other than the user therearound. In this case, even when it is wished not to be known by people other than the user about the notification from the voice control device, it can be known by people other than the user. Therefore, it has been desired to make a content of notification in response to an inquiry of a user difficult to be understood by people other than the user when the content of notification is output.

SUMMARY

An output-content control device, an output-content control method, and a non-transitory storage medium are disclosed.

According to one aspect, there is provided an output-content control device comprising: a voice classifying unit configured to analyze a voice spoken by a user and acquired by a voice acquiring unit to determine whether the voice is a predetermined voice; an intention analyzing unit configured to analyze the voice acquired by the voice acquiring unit to detect intention information indicating what kind of information is wished to be acquired by the user; a notification-information acquiring unit configured to acquire notification information to be notified to the user based on the intention information; and an output-content generating unit configured to generate an output sentence as sentence data to be output to the user based on the notification information, wherein the output-content generating unit is further configured to generate the output sentence in which at least one word selected among words included in the notification information is replaced with another word when the voice is determined to be the predetermined voice.

According to one aspect, there is provided an output-content control method comprising: analyzing an acquired voice spoken by a user to determine whether the voice is a predetermined voice; analyzing the acquired voice to detect intention information indicating what kind of information is wished to be acquired by the user; acquiring notification information to be notified to the user based on the intention information; and generating an output sentence as sentence data to be output to the user based on the notification information, wherein the generating further includes generating the output sentence in which at least one word selected among words included in the notification information is replaced with another word when the voice is determined to be the predetermined voice.

According to one aspect, there is provided a non-transitory storage medium that stores an output-content control program that causes a computer to execute: analyzing an acquired voice spoken by a user to determine whether the voice is a predetermined voice; analyzing the acquired voice to detect intention information indicating what kind of information is wished to be acquired by the user; acquiring notification information to be notified to the user based on the intention information; and generating an output sentence as sentence data to be output to the user based on the notification information, wherein the generating further includes generating the output sentence in which at least one word selected among words included in the notification information is replaced with another word when the voice is determined to be the predetermined voice.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 3 is a table showing an example of intention information;

FIG. 4 is a table showing an example of attribute information;

FIG. 5 is a table showing an example of acquisition information;

FIG. 6 is a table showing an example of relationship information;

DETAILED DESCRIPTION OF THE PREFERRED EMBODIMENTS

Embodiments of the present application are explained in detail below with reference to the drawings. The embodiments explained below are not intended to limit the present application.

First Embodiment

Figure 1:
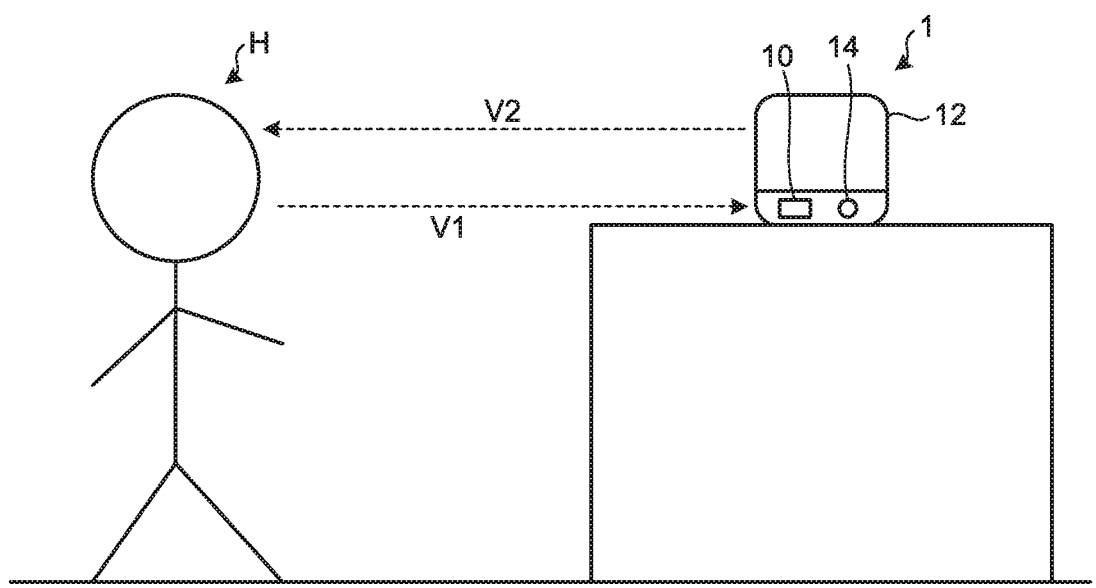
FIG. 1 is a schematic diagram of an output-content control device according to a first embodiment.

First, a first embodiment is explained. FIG. 1 is a schematic diagram of an output-content control device according to the first embodiment. As shown in FIG. 1, an output-content control device 1 according to the first embodiment detects a voice V1 spoken by a user H by a voice detecting unit 10, analyzes the detected voice V1 to perform a predetermined processing, and outputs a voice V2 by a voice output unit 12. Although the voice V2 is output toward the user H, when other people are present around the output-content control device 1, the voice V2 can be heard by those people. In this case, even if the voice V2 includes information that the user H wishes not to be known by other people, there is a risk that the voice V2 is heard by people other than the user H and the information is learned by them. The output-content control device 1 according to the present embodiment analyzes the voice V1 and adjusts sentences and the like to be output as the voice V2, and thereby enables to make contents of the voice V2 be understood appropriately only by the user H, and hardly by the people other than the user H.

Figure 2:
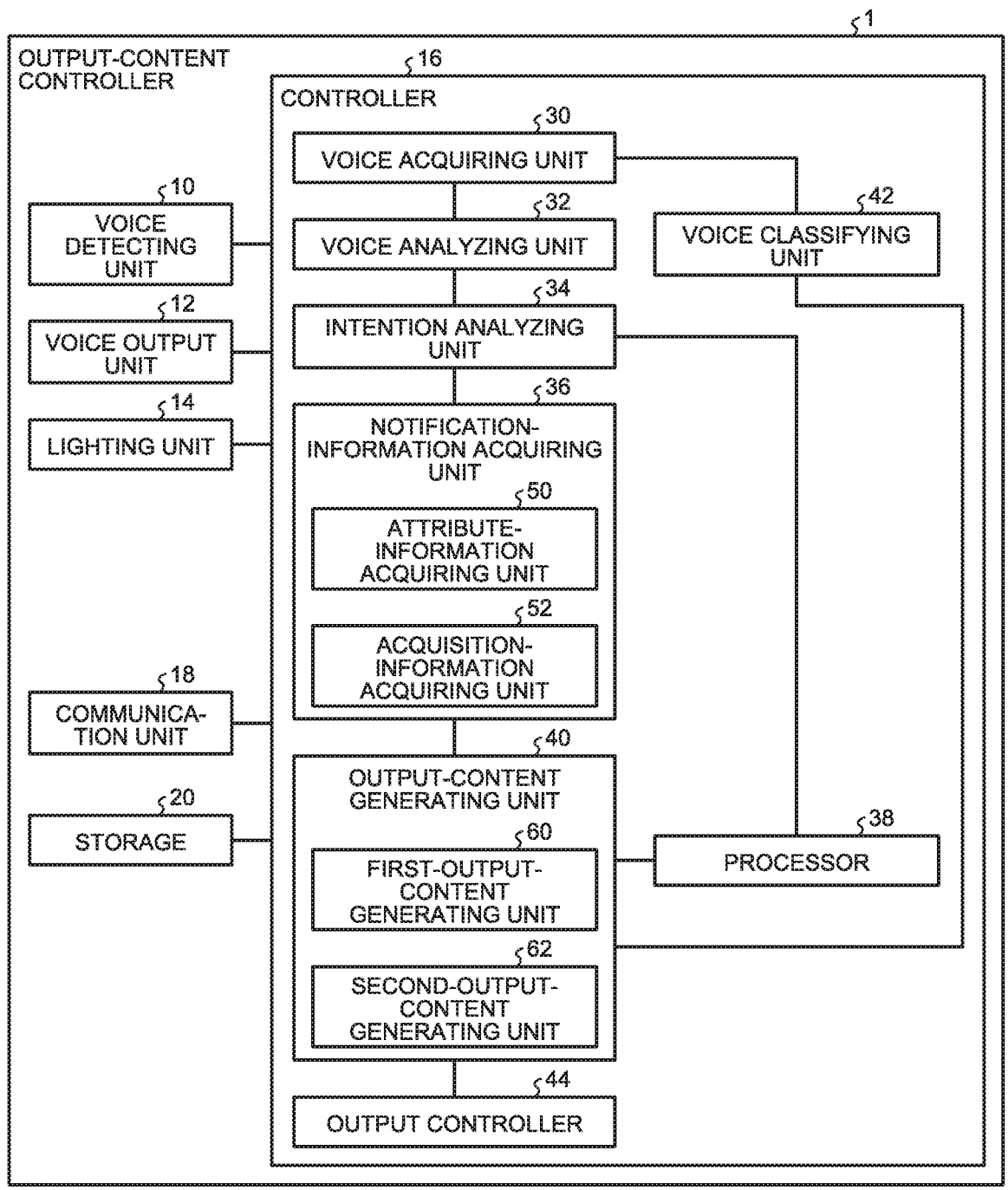
FIG. 2 is a schematic block diagram of the output-content control device according to the first embodiment.

FIG. 2 is a schematic block diagram of the output-content control device according to the first embodiment. As shown in FIG. 2, the output-content control device 1 includes the voice detecting unit 10, the voice output unit 12, a lighting unit 14, a controller 16, a communication unit 18, and a storage 20. The output-content control device 1 is a so-called smart speaker (artificial intelligence (AI) speaker), but is not limited thereto as long as the device has functions described later. The output-content control device 1 can be, for example, a smart phone, a tablet, and the like.

The voice detecting unit 10 is a microphone and detects the voice V1 spoken by the user H. The user H speaks the voice V1 toward the voice detecting unit 10 so as to include information about a processing wished to be performed by the output-content control device 1. The voice detecting unit 10 can be regarded as an input unit that accepts information input externally. The input unit can include a function other than the voice detecting unit 10 and, for example, a switch to adjust volume of the voice V2 by operation performed by the user H, and the like can be provided. The voice output unit 12 is a speaker, and outputs sentences (output sentences described later) generated by the controller 16 as the voice V2. The lighting unit 14 is a light source, such as a light emitting diode (LED), and is turned on by a control of the controller 16. The communication unit 18 is a mechanism to communicate with external servers, such as a Wi-Fi (registered trade mark) module and an antenna, and communicates information with an external server not shown under control of the controller 16. The communication unit 18 performs communication of information with external servers by wireless communication such as Wi-Fi, but the communication of information with external servers can be performed also by wired communication by cables connected. The storage 20 is a memory that stores information on arithmetic calculation of the controller 16 or programs, and includes, for example, at least one of a random access memory (RAM), a read-only memory (ROM), and an external storage device, such as a flash memory.

The controller 16 is an arithmetic unit, namely, a central processor (CPU). The controller 16 includes a voice acquiring unit 30, a voice analyzing unit 32, an intention analyzing unit 34, a notification-information acquiring unit 36, a processor 38, an output-content generating unit (voice-content generating unit) 40, a voice classifying unit 42, and an output controller 44. The voice acquiring unit 30, the voice analyzing unit 32, the intention analyzing unit 34, the notification-information acquiring unit 36, the processor 38, the output-content generating unit 40, the voice classifying unit 42, and the output controller 44 perform processes described later by reading software/program stored in the storage 20.

The voice acquiring unit 30 acquires the voice V1 that is detected by the voice detecting unit 10. The voice analyzing unit 32 performs voice analysis of the voice V1 acquired by the voice acquiring unit 30, to convert the voice V1 into text data. The text data is character data/text data that includes a sentence spoken as the voice V1. The voice analyzing unit 32 detects, for example, amplitude waveform/speech waveform per time from the voice V1. The voice analyzing unit 32 then replaces the amplitude waveform per time with a character based on a table in which a relationship between the amplitude waveforms and the characters is stored, thereby converting the voice V1 into text data. Note that the converting method can be arbitrarily chosen as long as it enables to convert the voice V1 into text data.

The intention analyzing unit 34 acquires the text data that is generated by the voice analyzing unit 32, and detects intention information I based on the text data. The intention information I is information indicating an intention of the user H, namely, an intent. In other words, the intention information I is information that indicates what kind of processing is intended by the user H to be performed on the output-content control device 1, and is information that indicates what kinds of information the user H wishes to obtain in the present embodiment.

The intention analyzing unit 34 extracts the intention information I from the text data by using, for example, a natural language processing. In the present embodiment, the intention analyzing unit 34 detects the intention information I from the text data based on multiple pieces of training data stored in the storage 20. The training data herein is data in which the intention information I has been assigned to text data in advance. That is, the intention analyzing unit 34 extracts the training data that is similar to the text data generated by the voice analyzing unit 32, and regards the intention information I of the extracted training data as the intention information I of the text data generated by the voice analyzing unit 32. Note that the training data is not necessarily required to be stored in the storage 20, and the intention analyzing unit 34 can search for the training data in an external server by controlling the communication unit 18. As long as the intention analyzing unit 34 extracts the intention information I from text data, the extracting method of the intention information I can be arbitrarily chosen. For example, the intention analyzing unit 34 can read a relationship table of keywords and the intention information I stored in the storage 20, and can extract the intention information I that is associated with the keyword when the keyword in the relationship table is included in text data.

FIG. 3 is a table showing an example of the intention information. For example, when text data is a sentence "today's schedule is", the intention analyzing unit 34 recognizes that a processing of informing about a schedule to the user H corresponds to the processing requested by the user H, that is, the intention information I, by performing analysis as described above. That is, the intention analyzing unit 34 detects that the information that the user wishes to acquire, that is, the intention information I, is a schedule.

The detecting method of the intention information I using text data can be arbitrarily chosen, not limited thereto. For example, the output-content control device 1 can be configured to store relationship table of keywords and the intention information I in the storage 20, and to detect the intention information I associated with the keyword when the keyword is included in text data of the voice V1 spoken by the user H. As an example of this case, a keyword "konnichiwa" may be associated with weather information and information of news. In this case, when the user H speaks the voice V1

"konnichiwa", the intention analyzing unit 34 detects the weather information and information of news as the intention information I.

The notification-information acquiring unit 36 acquires notification information that is a content of information to be given to the user H based on the intention information I. As shown in FIG. 2, the notification-information acquiring unit 36 includes an attribute-information acquiring unit 50 that acquires attribute information E, and an acquisition-information acquiring unit 52 that acquires acquisition information A. The notification information is information including the attribute information E and the acquisition information A.

The attribute-information acquiring unit 50 acquires the attribute information E based on the intention information I. The attribute information E is information that is associated with the intention information I, and is information that indicates a condition necessary for acquiring information that the user H wishes to acquire. Namely, the attribute information E is an entity. For example, even if it is determined that the intention information I is a schedule, the output-content control device 1 cannot determine which and whose schedule to notify when a condition to further specify the intention information I are unknown. In this case, the output-content control device 1 cannot provide notification according to the intention of the user H. For this, the attribute-information acquiring unit 50 acquires the attribute information E as a condition to further specify the intention information I to enable to determine which and whose schedule to notify.

FIG. 4 is a table showing an example of the attribute information. The attribute information E includes attribute type information E0 and attribute content information E1. The attribute type information E0 is information indicating types of condition, that is, what kinds of conditions they are, and in other words, it is information in which conditions to further specify the intention information I are classified. The attribute content information E1 is a content of the attribute type information E0. Therefore, the attribute type information E0 can be regarded as information indicating the types of the attribute content information E1. Therefore, the attribute type information E0 and the attribute content information E1 are associated with each other. As shown in FIG. 4, for example, when the attribute type information E0 includes "person" as one of the types of conditions, the attribute content information E1 associated therewith is to be information specifying a name of the person (in this example, "Mr. Yamada"). Furthermore, as the example shown in FIG. 4, when the attribute type information E0 includes "date" as one of the types of conditions, the attribute content information E1 associated therewith is to be information indicating a date (in this example, Mar. 20, 2020). By thus setting the attribute content information E1, it becomes certain that, for example, the schedule of Mr. Yamada on Mar. 20, 2020 should be notified. In the example of the present embodiment, Mr. Yamada is the user H himself.

In the present embodiment, the attribute-information acquiring unit 50 detects the attribute type information E0 from the extracted intention information I. The attribute-information acquiring unit 50 reads a relationship table of the intention information I and the attribute type information E0 stored in the storage 20, and detects the intention information I that coincides with the intention information I detected by the intention analyzing unit 34 from the relationship table. The attribute-information acquiring unit 50 then extracts and acquires the attribute type information E0 that is associated with the intention information I coincident with the intention information I detected by the intention analyzing unit 34. For example, when the intention information I is a schedule, a person and a date are included in the relationship table as the attribute type information E0 associated with a schedule. In this case, the attribute-information acquiring unit 50 extracts two pieces of information of a person and of a date as the attribute type information E0. As above, two pieces of the attribute type information E0 that correspond to one piece of the intention information I are present in this example, but the number of pieces of the attribute type information E0 corresponding to one piece of the intention information I may be different depending on the content of the intention information I. That is, the number of pieces of the attribute type information E0 corresponding to one piece of the intention information I can be one, or three or more. Moreover, the intention analyzing unit 34 reads the relationship table from the storage 20, but a source of the relationship table to be read from can be any source and, for example, the relationship table can be acquired from an external server by communicating with the external server/external device not shown through the communication unit 18.

Having acquired the attribute type information E0, the attribute-information acquiring unit 50 sets the attribute content information E1 for each of the attribute type information E0. The attribute-information acquiring unit 50 extracts, for example, the attribute content information E1 from the text data generated by the voice analyzing unit 32. For example, when a keyword "today" is included in the text data generated from the voice V1, the attribute content information E1 corresponding to the attribute type information E0 of a date is set to today's date ("Mar. 20, 2020" in the example of FIG. 4). Furthermore, the attribute-information acquiring unit 50 can set the attribute content information E1 corresponding to the attribute type information E0 in advance. In this case, when the intention information I is a schedule, for example, setting data indicating that the attribute content information E1 is a content determined in advance is stored in the storage 20. That is, for example, it is stored in advance that the attribute content information E1 corresponding to the attribute type information E0 of a person is "Mr. Yamada" in the storage 20. By this, the attribute-information acquiring unit 50 can set the attribute content information E1 of a person even when a keyword representing a person is not included in the text data. Moreover, the attribute-information acquiring unit 50 can set the attribute content information E1 by communicating with an external server by the communication unit 18. For example, when one of the attribute type information E0 is a location, the intention analyzing unit 34 can acquire a current position using a global positioning system (GPS) by communication, and can set it as the attribute content information E1. Moreover, the output-content control device 1 can output a notification to prompt the user H to provide information of the attribute content information E1. In this case, for example, the attribute-information acquiring unit 50 selects the attribute type information E0 for which acquisition of the attribute content information E1 is required, and causes the output-content generating unit 40 to generate a sentence to request the user H to give the attribute content information E1 for the output-content generating unit 40. For example, in the case of the attribute type information E0 of a date, the output-content generating unit 40 generates a sentence "Please provide a date for which the schedule is wished to be notified", or the like. Subsequently, the output controller 44 causes the voice output unit 12 to output this sentence. Thus, the user H speaks, for example, a voice indicating that the date is today, and the voice is analyzed by the voice analyzing unit 32, and the attribute-information acquiring unit 50 acquires information indicating that one of the attribute content information E1 is "today".

FIG. 5 is a table showing an example of acquisition information. The acquisition-information acquiring unit 52 shown in FIG. 2 acquires the acquisition information A based on the intention information I and the attribute information E. The acquisition information A is information according to an intention of the user H and is, in other words, information that the user H wishes to acquire. The acquisition information A includes the acquisition type information A0 and acquisition content information A1. The acquisition type information A0 is information that indicates what kind of information the user H wishes to acquire and is, in other words, information in which information desired by the user H is classified. The acquisition content information A1 indicates a content of the acquisition type information A0. That is, the acquisition type information A0 can be regarded as information indicating the type of the acquisition content information A1. Therefore, the acquisition type information A0 and the acquisition content information A1 are associated with each other. As shown in FIG. 5, for example, when the acquisition type information A0 includes "location" as one the type of information that the user H wishes to acquire, the acquisition content information A1 associated therewith is to be information indicating the location ("Tokyo building" in the example of FIG. 5).

In the present embodiment, the acquisition-information acquiring unit 52 detects the acquisition type information A0 from the intention information I. The acquisition-information acquiring unit 52 reads a relationship table of the intention information I and the acquisition type information A0 stored in the storage 20, and detects the intention information I that coincides with the intention information I detected by the intention analyzing unit 34 from the relationship table. The acquisition-information acquiring unit 52 then extracts and acquires the acquisition type information A0 that is associated with the intention information I that coincides with the intention information I detected by the intention analyzing unit 34 from the relationship table. For example, when the intention information I is a schedule, the relationship table includes a location, a time, what to do, and a person as the acquisition type information A0 associated with a schedule. In this case, the acquisition-information acquiring unit 52 extracts four pieces of information, a location, a time, what to do, and a person as the acquisition type information A0. As above, four pieces of the acquisition type information A0 that correspond to one piece of the intention information I are present in this example, but the number of the acquisition type information A0 corresponding to one piece of the intention information I may be different depending on the content of the intention information I. That is, the number of pieces of the acquisition type information A0 corresponding to one piece of the intention information I can be one, or three or more. Moreover, the acquisition-information acquiring unit 52 reads the relationship table from the storage 20, but a source of the relationship table to be read from can be any source and, for example, the relationship table can be acquired from an external server by communicating with the external server/external device not shown through the communication unit 18.

After having acquired the acquisition type information A0, the acquisition-information acquiring unit 52 acquires the acquisition content information A1 for each of the acquisition type information A0. The acquisition-information acquiring unit 52 acquires the acquisition content information A1 for each of the acquisition type information A0 for the attribute content information E1. That is, the acquisition-information acquiring unit 52 acquires the acquisition content information A1 under the condition of the attribute content information E1, for each of the acquisition type information A0. The acquisition-information acquiring unit 52 acquires, when the acquisition content information A1 is included in the storage 20, the acquisition content information A1 from the storage 20. Moreover, the acquisition-information acquiring unit 52 can acquire the acquisition content information A1 from an external server for each of the acquisition type information A0, by communicating with the external server/external device by the communication unit 18. That is, it can be said that the acquisition content information A1 is data that is acquired by the acquisition-information acquiring unit 52 from a database in an external server, the storage 20, and the like.

In this example, the acquisition-information acquiring unit 52 acquires the acquisition content information A1 based on the condition, Mr. Yamada's schedule on Mar. 20, 2020. In this case, for example, the acquisition-information acquiring unit 52 reads information about Mr. Yamada's schedule on Mar. 20, 2020 by communicating with a terminal serving as the external server that stores Mr. Yamada's schedule, or by reading Mr. Yamada's schedule stored in the storage 20 for each of the acquisition type information A0. Herein, a case in which Mr. Yamada's schedule on Mar. 20, 2020 is a meeting with Mr. Yoshida from 15 o'clock at Tokyo building is taken as an example. In this case, the acquisition-information acquiring unit 52 acquires information indicating "Tokyo building" as the acquisition content information A1 corresponding to a location in the acquisition type information A0, acquires information indicating "15 o'clock." as the acquisition content information A1 corresponding to a time in the acquisition type information A0, acquires information indicating "meeting" as the acquisition content information A1 corresponding to what to do in the acquisition type information A0, and acquires information indicating "Mr. Yoshida" as the acquisition content information A1 corresponding to a person in the acquisition type information A.

The acquisition-information acquiring unit 52 thus acquires the acquisition content information A1 that indicates a content of information that the user H wishes to acquire for each of the acquisition type information A0. The output-content generating unit 40 can notify about the information that the user H wishes to acquire by generating a sentence including this acquisition content information A1 as an output sentence to be notified to the user H. It should be noted that the output sentence to be notified to the user H may be include not only the acquisition content information A1 but also the attribute content information E1. Specifically, while a sentence that only includes the acquisition content information A1 is to be "Meeting with Mr. Yoshida from 15 o'clock at Tokyo building", a sentence that includes also the attribute content information E1 is to be "Mr. Yamada's schedule on Mar. 20, 2020 is a meeting with Mr. Yoshida from 15 o'clock at Tokyo building", and is easier to understand the content. That is, the information to be notified to the user may include the acquisition content information A1 and the attribute content information E1. Therefore, hereinafter, the attribute information E and the acquisition information A are referred to as notification information appropriately.

Moreover, it can be said that the notification information includes type information and content information. It can be said that the content information includes the attribute content information E1 and the acquisition content information A1, and indicates a content of information to be notified to the user H. Furthermore, it can be said that the type information represents the attribute type information E0 and the acquisition type information A0, indicates a type of information to be notified to the user, and indicates a type of the content information. It can be said that the notification-information acquiring unit 36 shown in FIG. 2 acquires the type information and the content information as the notification information.

The notification-information acquiring unit 36 performs a processing to acquire information that the user H wishes to acquire when a content of the intention information I indicates that the user H requests for notification of information. On the other hand, there is a case in which the user H requests the output-content control device 1 to control another device, other than requesting for the notification of information. For example, the user H can speak the voice V1 of "Turn on the light in the kitchen". In this case, the intention analyzing unit 34 detects the intention information I of controlling a device. The processor 38 shown in FIG. 2 then detects, based on this intention information I, "kitchen" as the attribute content information E1 corresponding to a location in the attribute type information E0, "light" as the attribute content information E1 corresponding to a target device in the attribute type information E0, and "turn on" as the attribute content information E1 corresponding to an operation in the attribute type information E0, and performs a control of turning on the light of the kitchen based on the attribute content information E1. In this case, the output-content generating unit 40 generates an output sentence, "Yes, the operation is completed", and the output controller 44 causes the voice output unit 12 to output this output sentence. However, the output-content control device 1 should only be one that notifies about information that the user H wishes to acquire, and a processing of controlling another device as described above may be not required to be performed.

Referring back to FIG. 2, the output-content generating unit 40 generates an output sentence based on the notification information, more specifically, the attribute content information E1 and the acquisition content information A1, acquired by the notification-information acquiring unit 36. The output sentence is data of a sentence for the voice V2 to be output by the voice output unit 12, that is, text data. It can be said that the output sentence is dialog data. The output-content generating unit 40 includes a first output-content-generating unit 60 that generates a first output sentence as the output sentence, and a second output-content-generating unit 62 that generates a second output sentence as the output sentence. The voice classifying unit 42 is explained before explaining about the first output-content-generating unit 60 and the second output-content-generating unit 62.

The voice classifying unit 42 analyzes the voice V1 acquired by the voice acquiring unit 30, and determines whether the voice is a predetermined voice. In the present embodiment, the voice classifying unit 42 analyzes the voice V1 acquired by the voice acquiring unit 30, and classifies the voice V1 to either one of a first voice V1A and a second voice V1B. The first voice V1A corresponds to a predetermined voice. In the present embodiment, the voice classifying unit 42 classifies the voice V1 to the first voice V1A when the voice V1 is determined to be a whisper as a result of analysis (determines as the predetermined voice). The voice classifying unit 42 classifies the voice V1 to the second voice V1B when the voice V1 is determined not to be a whisper. A whisper is an unvoiced voice spoken without vibrating the vocal chords, but it is not limited to the unvoiced voice spoken without vibrating the vocal chords as long as being classified to the first voice V1A by, for example, a method described later.

For example, the voice classifying unit 42 acquires a time waveform of intensity of the voice V1, and performs Fourier-transformation on the time waveform, thereby acquiring a spectrum that indicates intensity of the voice V1 per frequency. The voice classifying unit 42 classifies the voice V1 either to the first voice V1A or the second voice V1B by using a peak frequency that is equal to or higher than a predetermined intensity in the spectrum as a feature value. For example, the voice classifying unit 42 determines the voice as a whisper to classify to the first voice V1A when the peak frequency is equal to or lower than the threshold, and determines the voice as not a whisper to classify to the second voice V1B when the peak frequency is larger than the threshold. Note that the voice classifying unit 42 can perform the classification to the first voice V1A and the second voice V1B by using any method. For example, the voice classifying unit 42 can perform the classification to the first voice V1A and the second voice V1B by using a slope of the peak in the spectrum as a feature value. Moreover, the voice classifying unit 42 can perform the classification to the first voice V1A and the second voice V1B by using either one of a volume of the voice V1, a speaking speed of the user in the voice V1, and a volume ratio between a speech of a person and a wind noise as a feature value. Furthermore, a proximity sensor can be provided in the output-content control device 1, a distance between the user H and the output-content control device 1 is calculated from a detection result of the proximity sensor, and the distance can be used as a feature value to perform the classification to the first voice V1A and the second voice V1B. Moreover, the voice classifying unit 42 can derive a Mel-frequency cepstrum coefficient as a feature value, and can perform the classification to the first voice V1A and the second voice V1B based on the mel-frequency cepstrum coefficient. In these cases, the voice classifying unit 42 sets a threshold of the feature value, and classifies the voice V1 to either the first voice V1A or the second voice V1B based on whether the feature value exceeds the threshold.

As described above, the voice classifying unit 42 classifies the voice V1 by using the voice V1 that is acquired by the voice acquiring unit 30. That is, the voice classifying unit 42 classifies the voice V1 to the first voice V1A when the voice V1 is a whisper, and to the second voice V1B when the voice V1 is not a whisper even when meaning of the voice V1 is the same.

Moreover, the voice classifying unit 42 is not limited to perform the classification to the first voice V1A or the second voice V1B, using the voice V1. The classification can be performed by generating text data of the voice V1 by performing character analysis of the voice V1 that is acquired by the voice acquiring unit 30, and by using the text data of the voice V1. For example, the voice classifying unit 42 can classify the voice V1 not by judging whether the voice is a whisper, but based on a keyword included in the voice V1. That is, the voice classifying unit 42 can classify the voice V1 to the first voice V1A when a keyword stored in the storage 20 is included in the voice V1, and to the second voice V1B when the keyword stored in the storage 20 is not included.

The voice classifying unit 42 can use either one of the classification methods explained above, or can perform the classification by combining the classification methods explained above.

The output-content generating unit 40 causes the second output-content-generating unit 62 to generate the second output sentence when the voice classifying unit 42 classifies the voice V1 to the second voice V1B. That is, the output-content generating unit 40 generates the second output sentence, not generating the first output sentence when the voice V1 is classified to the second voice V1B. The second output-content-generating unit 62 generates a sentence that includes all pieces of information of the attribute content information E1 acquired by the attribute-information acquiring unit 50, the acquisition content information A1 acquired by the acquisition-information acquiring unit 52, and the intention information I acquired by the intention analyzing unit 34, as the second output sentence. That is, the second output sentence is text data that includes all of the attribute content information E1, the acquisition content information A1, and the intention information I.

Furthermore, it can be said that the second output sentence is text data that includes words indicating a content of the intention information I, words indicating a content of the attribute content information E1, and words indicating a content of the acquisition content information A1. The word indicating the content of the intention information I herein is a noun "schedule". Moreover, the words indicating the content of the attribute content information E1 herein are a noun (more specifically, a proper noun) "Mr. Yamada" and a word "Mar. 20, 2020" which includes numeric values. Furthermore, the words indicating the content of the acquisition content information A herein include nouns (more specifically, proper nouns) "Tokyo building", "Mr. Yoshida", a noun "meeting", and a numeric value "15 o'clock". It can be said that the second output sentence is text data that includes all of these words. Specifically, the second output sentence in this example is to be "Mr. Yamada's schedule on Mar. 20, 2020 is a meeting with Mr. Yoshida from 15 o'clock at Tokyo building". Note that the second output sentence is not required to include all of the words indicating the contents of the intention information I, the attribute content information E1, and the acquisition content information A1, and can exclude at least either one of the words indicating the content of the intention information I, the attribute content information E1, and the acquisition content information A1. The second output sentence is different from the first output sentence described later, and the words indicating the content of the intention information I, the attribute content information E1, and the acquisition content information A1 should not be replaced with other words.

On the other hand, the output-content generating unit 40 causes the first output-content-generating unit 60 to generate the first output sentence when the voice V1 is classified into the first voice V1A by the voice classifying unit 42. That is, the output-content generating unit 40 generates the first output sentence when the voice V1 is classified into the first voice V1A, not generating the second output sentence. The first output-content-generating unit 60 generates a sentence in which a word selected from among words included in the content information (the attribute content information E1 and the acquisition content information A1) is replaced with another word, as the first output sentence. Specifically, the first output-content-generating unit 60 acquires words indicating the intention information I, words indicating the content of the attribute content information E1, and words indicating the content of the acquisition content information A1. Subsequently, the first output-content-generating unit 60 selects a word to be replaced with another word from among the words indicating the content of the intention information I, the attribute content information E1, and the acquisition content information A1. The first output-content-generating unit 60 then replaces the selected word with the other word, leaving the not-selected words without replacing with the other word. Therefore, the first output sentence is to be a sentence that includes words that has not been replaced with other words among words indicating the content of the intention information I, the attribute content information E1, and the acquisition content information A1, and a word that has been replaced with the other word among the words indicating the content of the intention information I, the attribute content information E1, and the acquisition content information A1. As described above, in the present embodiment, a word to be replaced is selected from the notification information that includes the attribute content information E1 and the acquisition content information A1. Note that the first output-content-generating unit 60 can select a word to be replaced also from the intention information I, regarding the intention information I also as the notification information.

It is preferable that the first output-content-generating unit 60 select a noun, more preferably, a proper noun as a word to be replaced. However, also a verb or a numeric value can be selected as a word to be replaced. Note that when a word to be replaced is a noun, a word after replacement is preferable to be a noun also, and when a word to be replaced is a verb, a word after replacement is preferable to be a verb also, and when a word to be replaced is a numeric value, a word after replacement is preferable to be a numeric value also. By thus keeping parts of speech consistent before and after the replacement, it is suppressed that the first output sentence after the replacement becomes difficult even for the user H.

Content information and replacement information are associated with each other. In other words, the attribute content information E1 and the attribute type information E0 are associated with each other, for example, as "Mr. Yamada" and "person" shown in FIG. 4, and also the acquisition content information A1 and the acquisition type information A0 are associated with each other, for example, as "meeting" and "what to do" shown in FIG. 5. The first output-content-generating unit 60 selects a word to be replaced with another word based on words included in the attribute content information E1 and on the attribute type information E0 associated with the attribute content information E1. Similarly, the first output-content-generating unit 60 selects a word to be replaced with another word based on words included in the acquisition content information A1 and on the acquisition type information A0 associated with the acquisition content information A1. In the following, it is more specifically explained.

FIG. 6 is a table showing an example of relationship information. The storage 20 has the relationship information as shown in FIG. 6 stored therein as a table in advance. The relationship information herein is information in which a word to be replaced (first word) and a replacing word (second word) that is a word after replacement are associated with each other. The replacement information includes multiple words to be replaced different from one another, and one replacing word is associated with one word to be replaced. That is, the relationship information has multiple sets of the word to be replaced and the replacing word. The replacing word is different per the word to be replaced, that is, different per set. Although the word to be replaced and the replacing word are both nouns in this example, they can be verbs or numeric values. However, it is preferable that the replacing word be a noun when the word to be replaced is a noun, that the replacing word be a verb when the word to be replaced is a verb, and that the replacing word be a numeric value when the word to be replaced is a numeric value.

Moreover, the relationship information includes type information that represents a type information indicated by the word to be replaced. The relationship information includes sets of a word to be replaced and a replacing word per type information. For example, in the example in FIG. 6, the type information is what to do. Therefore, in the example in FIG. 6, the relationship information includes a set of the word to be replaced "meeting" and the replacing word "hospital visit", and a set of the word to be replaced "dinner" and the replacing word "meeting" for the type information of "what to do". Note that although the number of sets per the type information is two in the example in FIG. 6, it can be any number. Moreover, although the example in which the type information is "what to do" is shown in the example in FIG. 6, respective sets of the word to be replaced and the replacing word for multiple kinds of the type information can be included.

The first output-content-generating unit 60 reads the relationship information as described above from the storage 20. The first output-content-generating unit 60 then detects whether a type information matched with the acquisition type information A0 associated with the content information (for example, "what to do" in FIG. 5) is present in the relationship information. Subsequently, when the matched type information is present in the relationship information, the first output-content-generating unit 60 detects whether a word included in the acquisition content information A1 associated with the acquisition type information A0 (for example, "meeting" in FIG. 5) is included in the relationship information as a word to be replaced (for example, "meeting" in FIG. 6). The first output-content-generating unit 60, when the word included in the acquisition content information A1 is included in the relationship information as a word to be replaced, selects and replaces the word to be replaced with a word being associated thereto. That is, when the type information of the word included in the content information matches with the type information of the word to be replaced and also the word included in the content information matches with the word to be replaced, the first output-content-generating unit 60 selects the word included in the content information as a word to be replaced with another word. The first output-content-generating unit 60 then replaces the selected word with a replacing word being associated therewith. Note that it is preferable that even if either one of the matching of the type information and the matching of the word is determined, the first output-content-generating unit 60 should not select and replace the word included in the content information as a word to be replaced with another word.

In this example, because the type information in the relationship information is "what to do", it matches with the type information (the acquisition type information A0) "what to do" shown in FIG. 5. Furthermore, in this example, the content information (the acquisition content information A1) for the type information "what to do" is "meeting" as shown in FIG. 5, and the word to be replaced for the type information "what to do" includes "meeting", which matches therewith. Therefore, in this example, the matching of the type information "what to do" is determined, and the matched word is "meeting". Therefore, the word "meeting" for the acquisition type information A0 "what to do" shown in FIG. 5 is replaced with a replacing word "hospital visit". Moreover, in this example, since there is no content information with both the matched type information and the matched word except the word "meeting", no other words are replaced. Therefore, in this example, the first output-content-generating unit 60 generates a sentence "Mr. Yamada's schedule on Mar. 20, 2020 is dinner with Mr. Yoshida from 15 o'clock at Tokyo building" as the first output document, in which "meeting" is replaced with "dinner".

In this explanation, the storage 20 stores the relationship information as a table. That is, the relationship information is information that is set in advance. However, the relationship information is not limited to that stored in the storage 20. The first output-content-generating unit 60 can generate relationship information from information relating to the user H (Mr. Yamada herein). For example, when information relating to the user H is stored in the output-content control device 1 or other devices owned by the user H, the first output-content-generating unit 60 reads the information and generates the relationship information from the information.

For example, there is a case in which a contact list including names of persons is set in the output-content control device 1 or other devices owned by the user H, and different names (nickname or the like) are designated to the names of the persons by the user H. In this case, the first output-content-generating unit 60 reads the names and the designated different names of the person from the contact list to generate the relationship information. That is, in this case, the first output-content-generating unit 60 generates the relationship information "person" as the type information, and sets the name of the person as the word to be replaced in the relationship information (for example, Mr. Yoshida), and sets the designated different name (for example, Yoshi) as the replacing word that has been set for the person. In this case, both the type information and the word in the acquisition content information A1 of "Mr. Yoshida" shown in FIG. 5 matches with those in the relation information. Therefore, "Mr. Yoshida" is replaced with "Yoshi" as the replacing word. In this case, the first output sentence is to be "Mr. Yamada's schedule on Mar. 20, 2020 is a meeting with Yoshi from 15 o'clock at Tokyo building".

Moreover, for example, there is a case in which a map application or an address book is stored in the output-content control device 1 or other devices owned by the user H, and different names are designated to addresses or buildings included therein by the user H. In this case, the first output-content-generating unit 60 reads the names of the addresses or the buildings from the map application or the address book to generate relationship information. That is, in this case, the first output-content-generating unit 60 generates the relationship information "location" as the type information, and sets the address or the building (for example, Tokyo building) as the word to be replaced in the relationship information, and sets the designated different name as the replacing word (for example, T bldg.) that has been set for the address or the building. In this case, both the type information and the word in the acquisition content information A1 of "Tokyo building" shown in FIG. 5 matches with those in the relation information. Therefore, "Tokyo building" is replaced with "T bldg." as the replacing word. In this case, the first output sentence is to be "Mr. Yamada's schedule on Mar. 20, 2020 is a meeting with Mr. Yoshida from 15 o'clock at T bldg."

When the output-content control device 1 has the relationship information stored therein as a table, the output-content control device 1 can add relationship information newly generated based on the information relating to the user H as described above to the table.

As described above, the relationship information is understandable for the user H but difficult for people other than the user H since the word to be replaced and the replacing word are set in advance. Therefore, when the first output sentence is output in voice, the content is understandable for the user H, but is difficult to be understood by the people other than the user H, thereby enabling to suppress the information being known by people other than the user H. Furthermore, the first output-content-generating unit 60 replaces a word with another when the type information in the content information matches with that in the relationship information. Therefore, when there is a word having different type information, that is, when there is a word, the meaning of which is different but reading of which is the same, the first output-content-generating unit 60 avoids the word being replaced, to suppress the first output sentence after replacement becoming difficult for the user H. However, the first output-content-generating unit 60 can replace the word as long as the word in the content information matches with that in the relationship information, even if the type information in the content information does not match with that in the relationship information.

Moreover, although the first output-content-generating unit 60 replaces a word using the relationship information in which the words to be replaced and the replacing words are set in advance in the above explanation, it is not necessarily required to use such relationship information for the replacement of the word. For example, the first output-content-generating unit 60 may replace a word included in content information with a word of a broader term of the word. The word of a broader term means that the word includes other words, and more specifically, the word is a more general, more generic, or more abstract term. That is, when the word included in the content information is replaced with a word of a broader term, the words other than the word included in the content information which are included in the word of the broader term can be replaced. Therefore, people other than the user H cannot infer the word included in the content information before the replacement even if they hear the word of the broader term, and it is possible to suppress the information from being known by people other than the user H. On the other hand, the user H can infer the word included in the content information before the replacement by hearing the word of the broader term because the user H is often aware of the word included in the content information in the first place, and can understand the content. In this case, the first output-content-generating unit 60 can also perform the replacement based on the type information. That is, the first output-content-generating unit 60 replaces the word included in the content information with the word of the broader term when the word included in the content information can be replaced with the broader term (for example, in the case of a proper noun as described later) and the type information associated with the content information corresponds to predetermined type information set in advance.

For example, when the word included in the content information is a proper noun, the first output-content-generating unit 60 replaces the word with an initial of the proper noun. That is, the initial is regarded to be a broader term of the proper noun. In this case, the first output-content-generating unit 60 can also perform the replacement based on the type information. That is, the first output-content-generating unit 60 replaces the word (proper noun) with the initial when the word included in the content information is a pronoun, and when the type information associated with the content information corresponds to predetermined type information set in advance, for example, when it corresponds to the type information relating to a name of "person", "company name", "store name", and the like. In this case, for example, the first output sentence is to be "Mr. Y's schedule on Mar. 20, 2020 is a meeting with Mr. Y from 15 o'clock at Tokyo building".

Moreover, for example, when the type information associated with the content information is a location, the first output-content-generating unit 60 replaces the word included in the content information with a name of facilities located near the place in the content information, a name of an area (town, ward, or street) to which the building or the address in the content information belongs, or the like. That is, the name of the facilities located in neighborhood or the name of the area is regarded as the broader term. For example, when "Tokyo building" shown in FIG. 5 is replaced with "Tokyo station", the first output sentence is to be "Mr. Yamada's schedule on Mar. 20, 2020 is a meeting with Mr. Yoshida from 15 o'clock near Tokyo station".

The first output-content-generating unit 60 generates a sentence in which a word selected from among words included in the content information is replaced with another word as the first output sentence as described above when a voice is classified into the first voice V1A. The methods of replacing words explained above can be combined to be used, or only either one can be used. By combining the methods, it is possible to make it more difficult for other people to understand the output sentence.

Referring back to FIG. 2, the output controller 44 acquires the output sentences generated by the output-content generating unit 40, that is, the first output sentence or the second output sentence. The output controller 44 converts the output sentences in text data into voice data, and causes the voice output unit 12 to output the voice data as the second voice V2. Moreover, the output controller 44 can control the lighting unit 14 to turn on a light when the voice V2 is output, when the processing by the processor 38 is completed, when the voice V1 is detected, or the like.

Figure 7:
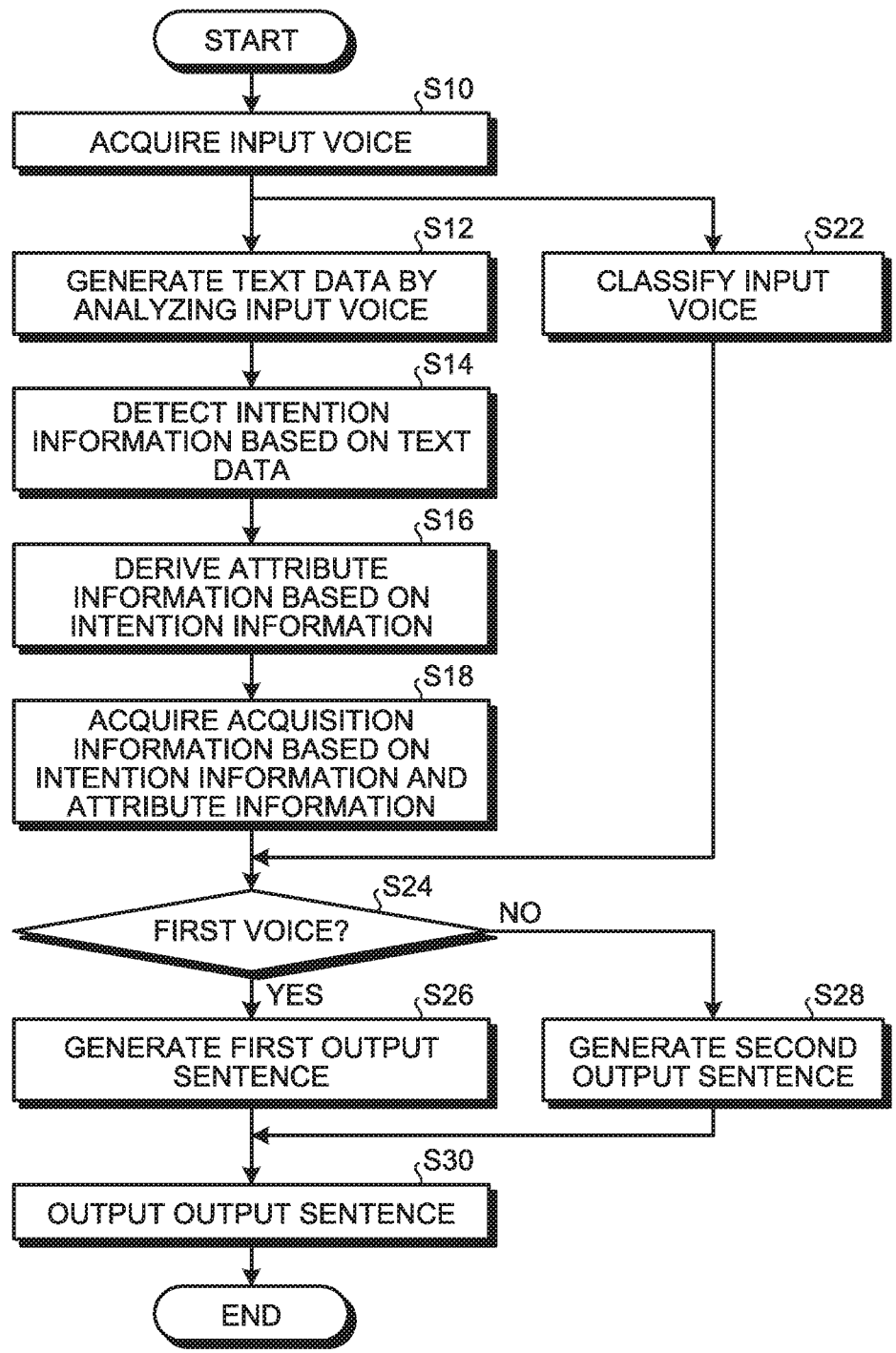
FIG. 7 is a flowchart showing a flow of an output processing of output sentence according to the first embodiment.

The controller 16 has a configuration as described above. A flow of output processing of an output sentence by the controller 16 is explained based on a flowchart. FIG. 7 is a flowchart showing a flow of output processing of output sentence according to the first embodiment. As shown in FIG. 7, the controller 16 acquires input voice, that is voice data of the voice V1 by the voice acquiring unit 30 (step S10). The controller 16 causes the voice analyzing unit 32 to analyze the voice data of the voice V1 acquired by the voice acquiring unit 30, and generates text data (step S12). Subsequently, the controller 16 causes the intention analyzing unit 34 to detect the intention information I from the text data (step S14), and causes the attribute-information acquiring unit 50 to derive the attribute information E based on the intention information I (step S16). The attribute-information acquiring unit 50 acquires the attribute type information E0 and the attribute content information E1 based on the intention information I. After having derived the attribute information E, the controller 16 causes the acquisition-information acquiring unit 52 to acquire the acquisition information A, that is the acquisition type information A0 and the acquisition content information A1 based on the intention information I and the attribute information E (step S18). Moreover, when the input voice, namely the voice V1, is acquired at step S10, the controller 16 causes the voice classifying unit 42 to classify the voice V1 to either one of the first voice V1A and the second voice V1B (step S22).

The controller 16 determines whether the voice V1 is the first voice V1A (step S24), and when it determines that the voice V1 is the first voice V1A (step S24: YES), causes the first output-content-generating unit 60 to generate the first output sentence (step S26). On the other hand, when it determines that the voice V1 is not the first voice V1A (step S24: NO), that is, the voice V1 is the second voice V1B, the controller 16 causes the second output-content-generating unit 62 to generate the second output sentence (step S28). After having generated the output sentence, that is, the first output sentence or the second output sentence, the controller 16 causes the output controller 44 to output the output sentence as the voice V2 by the voice output unit 12 (step S30), and ends the processing. That is, when the first output sentence is generated, the output controller 44 converts the first output sentence into voice data, and causes the voice output unit 12 to output it as the voice V2. When the second output sentence is generated, the output controller 44 converts the second output sentence into voice data, and causes the voice output unit 12 to output it as the voice V2.

As explained above, the output-content control device 1 according to the present embodiment includes the voice classifying unit 42, the intention analyzing unit 34, the notification-information acquiring unit 36, and the output-content generating unit 40. The voice classifying unit 42 analyzes the voice V1 spoken by the user H and acquired by the voice acquiring unit 30, and determines whether the voice V1 is a predetermined voice (the first voice V1A). The intention analyzing unit 34 analyzes the voice V1 acquired by the voice acquiring unit 30, and detects the intention information I that indicates what kind of information the user H wishes to acquire. The notification-information acquiring unit 36 acquires the notification information that is information to be notified to the user H based on the intention information I. The output-content generating unit 40 generates the output sentence that is sentence data to be output to the user H, based on the notification information. The output-content generating unit 40 generates the output sentence in which a word selected from among words included in the notification information is replaced with another word (the first output sentence) when the voice V1 is classified into the first voice V1A, that is, determined as the predetermined voice.

The voice V2 output as the voice data of the output sentence is output toward the user H, but can be heard by people other than the user H around the output-content control device 1 as described above. However, it can be preferable that the content of the voice V2 be not known by anyone other than the user H, for example, considering privacy. When the user H does not want other people to know the content of the voice V2, that is, the content of the output sentence from the output-content control device 1, the user H changes the voice V1 into the voice V1 in whispers even when speaking the same content. The output-content control device 1 determines that it is required to avoid the content being known by people other than the user H when the voice V1 classified into the first voice V1A is detected, and generates the first output sentence for the voice V2. In the first output sentence, the content information, that is, a word included in the content to be notified to the user H (information that the user H wishes to know) is replaced with another word. Thus, it becomes difficult to understand the meaning of the first output sentence for the people other than the user H as the replacement of the word with the other word is performed, thereby enabling to make the content difficult to be understood by the people other than the user H.

Furthermore, the output-content generating unit 40 generates the second output sentence in which a word included in the notification information is not replaced when the voice V1 is classified into the second voice V1B. The output-content control device 1 analyzes the voice V1 of the user, and determines that it can be known by the people other than the user H when the voice V1 that is classified into the second voice V1B is detected, and generates the second output sentence without replacing a word. Thus, it is possible to suppress the replacement of a word when it is not required.

Moreover, the notification-information acquiring unit 36 acquires the content information that is the content of information to be notified to the user H, and the type information that indicates a type of the content information, as the notification information. The output-content generating unit 40 selects a word to be replaced with another word based on the word included in the content information and the type information that is associated with the content information. When a word included in the content information is replaced with another word, it may become difficult to be understood also by the user H. Thus, the output-content control device 1 selects a word to be replaced, based on the information to be notified and the type of the information, and the random replacement of the word is thereby suppressed, and it is prevented from making it difficult for the user H to understand the output sentence.

Moreover, the output-content generating unit 40 reads relationship information including information about a word to be replaced (first word) being a predetermined word, and a replacing word (second word) associated with the word to be replaced (first word). The output-content generating unit 40 replaces the word included in the notification information with the replacing word (second word) when the word included in the notification information matches with the word to be replaced (first word). Since the word to be replaced and the replacing word are set in advance in the relationship information, it is possible for the user H to recognize the output sentence but is difficult for the people other than the user H to recognize the output sentence. Therefore, the output-content control device 1 can suppress information being known by the people other than the user H appropriately, keeping the content thereof understandable for the user H, because the replacement with the replacing word is performed as described above.

Moreover, the relationship information also includes information of the type information that indicates a type of the word to be replaced (first word). The output-content generating unit 40 selects a word included in the notification information as a word to be replaced with another word when the type information of the word included in the notification information and the type information of the word to be replaced (first word) match with each other and the word included in the notification information matches with the word to be replaced (first word). As described above, the output-content control device 1 replaces a word with the word to be replaced when the type information thereof matches with that of the word to be replaced. Therefore, when there is a word of a different type, that is, a word the meaning of which is different but reading of which is the same, the first output-content-generating unit 60 avoids the word being replaced with the other word, thereby suppressing the first output sentence after the replacement becoming difficult also for the user H.

Furthermore, the output-content generating unit 40 replaces a word included in the notification information with a word of a broader term of the word. Since the people other than the user H cannot infer the word included in the content information before the replacement when the people hear the word of the broader term, it is possible to suppress the information being known by the people other than the user H. On the other hand, since the user H can be aware of the word included in the content information in the first place, the user H can infer the word included in the notification information before the replacement when hearing the word of the broader term, and can understand the content appropriately.

Moreover, the output-content generating unit 40 replaces, when a word included in the notification information is a proper noun, the word with an initial of the proper noun. The people other than the user H cannot infer the word included in the notification information before the replacement when the people hear the initial, and it is possible to suppress the information being known by the people other than the user H. On the other hand, since the user H can be aware of the word included in the content information in the first place, the user H can infer the word included in the notification information before the replacement when hearing the initial, and can understand the content appropriately.

The voice classifying unit 42 classifies the voice V1 into the first voice V1A when the voice V1 spoken by the user is a whisper. The output-content control device 1 detects a whisper and, in that case, generates the first output sentence. It is thereby appropriately determined whether the content is preferable not to be known by the people other than the user H, and is possible to suppress the influence thereof appropriately.

Figure 8:
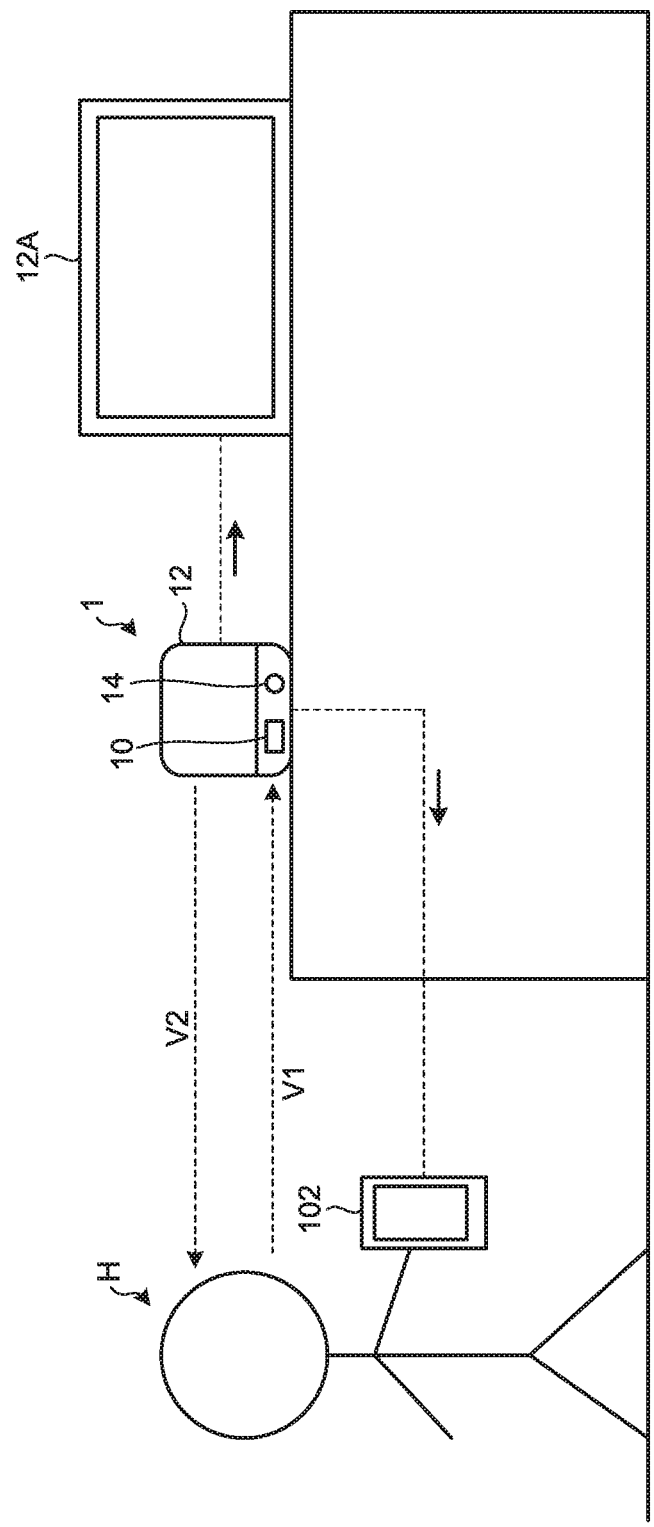
FIG. 8 is a schematic diagram showing another example of the output-content control device according to the first embodiment.

FIG. 8 is a schematic diagram showing another example of the output-content control device according to the first embodiment. In the output-content control device 1 according to the first embodiment, the output controller 44 converts the output sentence into the voice data, and causes the voice output unit 12 to output the voice data as the voice V2 as described above. However, when outputting the first output sentence, the output-content control device 1 can output the first output sentence as text data to an output unit other than the voice output unit 12 as shown in FIG. 8. For example, the output-content control device 1 can cause a display device 12A that is connected to the output-content control device 1 to display the first output sentence. Moreover, the output-content control device 1 can cause a terminal device 102 owned by the user H to display the first output sentence. Furthermore, the output-content control device 1 can attach the first output sentence to an e-mail and send the email to a predetermined destination. In this case, it is preferable that the output-content control device 1 determine a transmission destination in advance. As described above, when outputting the first output sentence, the output-content control device 1 can output the first output sentence as text data, not in a voice. In this case, since a voice is not output, it is possible to avoid it being heard by other people, and to further reduce the possibility that the content is known by other people. Furthermore, even if the text data is seen by people, since the word is replaced as the first output sentence, it is difficult for other people to understand the sentence.

Second Embodiment

Next, a second embodiment is explained. While the output-content control device 1 according to the first embodiment includes the voice detecting unit 10 and the voice output unit 12, an output-content control device 1A according to the second embodiment does not include the voice detecting unit 10 and the voice output unit 12. In the second embodiment, explanation of parts having the common configurations with the first embodiment is omitted.

Figure 9:
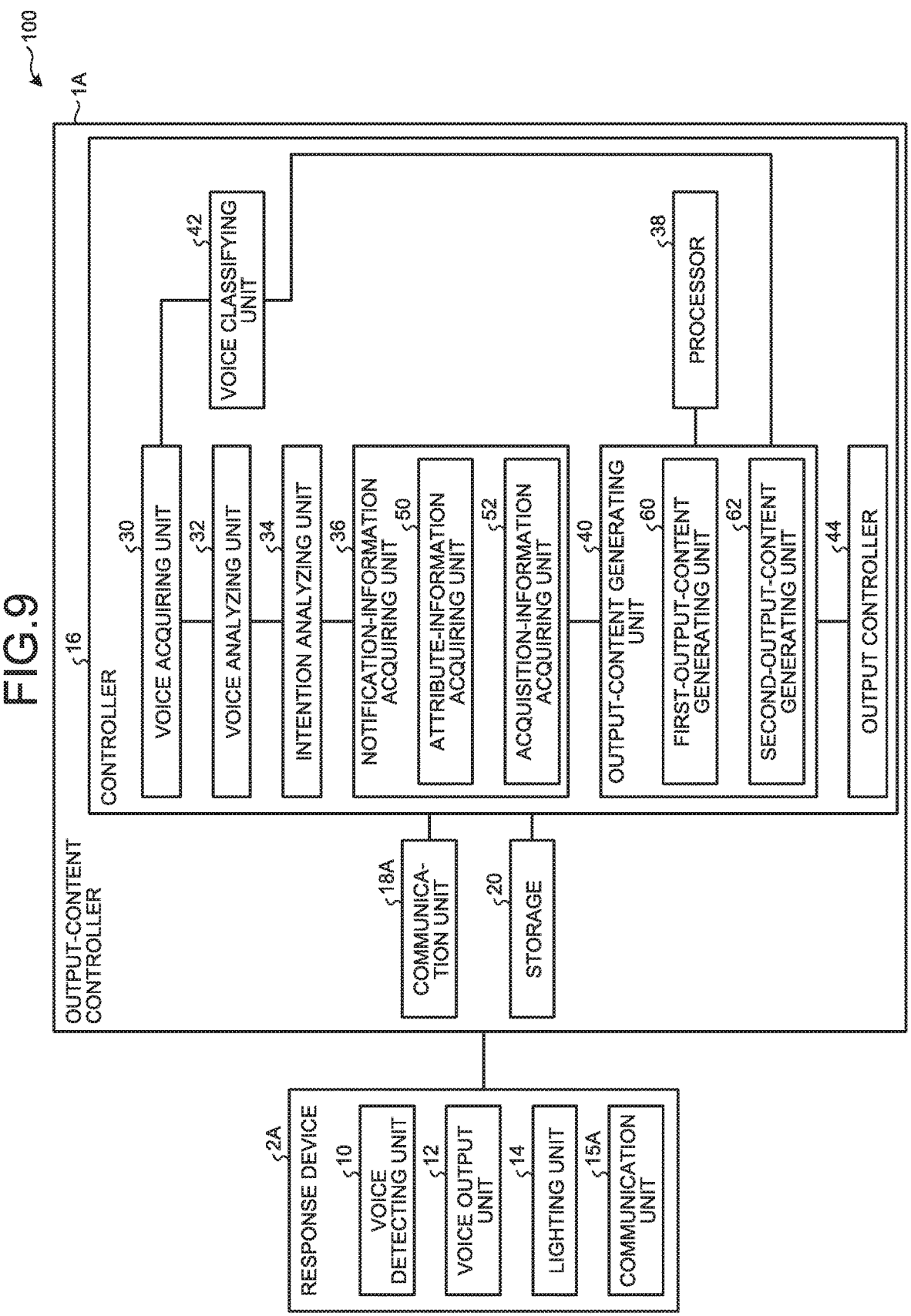
FIG. 9 is a schematic block diagram of an information output system according to a second embodiment.

FIG. 9 is a schematic block diagram of an information output system according to the second embodiment. As shown in FIG. 9, an information output system 100 according to the second embodiment includes the output-content control device 1A and a response device 2A. The response device 2A is, for example, a smart speaker, and includes the voice detecting unit 10, the voice output unit 12, the lighting unit 14, and a communication unit 15A. The output-content control device 1A is a device (server) positioned distant from the response device 2A, and includes the controller 16, a communication unit 18A, and the storage 20. The output-content control device 1A and the response device 2A are connected by wireless communication, but can be connected by wired communication.

The output-content control device 1A acquires the voice V1 that has been detected by the voice detecting unit 10 through information communication via the communication unit 15A and the communication unit 18A. The output-content control device 1A then generates the output sentence by performing similar processing as the first embodiment, and outputs the output sentence to the response device 2A. The response device 2A converts the output sentence into the voice data by the voice output unit 12 to output as the voice V2. Note that the output-content control device 1A can generate the output sentence and transmit to the response device 2A. In this case, the voice output unit 12 outputs the acquired voice data as the voice V2. As described, the information output system 100 includes the output-content control device 1A, the voice detecting unit 10 that detects the voice V1 spoken by the user H, and the voice output unit 12 that outputs the output sentence generated by the output-content generating unit 40 as the voice V2. As described above, the output-content control device 1A produces effects similar to those of the first embodiment even when the response device 2A is a separate unit. That is, it can be said that the output-content control device 1 according to the first embodiment is integrated with the response device 2A and, in other words, can also be regarded as an information output system.

As described above, the information output system includes the output-content control device, and an output unit that outputs the output sentence generated by the output-content generating unit 40. The output unit is a voice output unit 12 that outputs the output sentence as a voice, but can also be the display device 12A or the like as described above, and the method of outputting the output sentence can be in voice or in text data.

According to the present application, when a content of inquiry of a user is notified, a notification content can be made difficult to be understood by people other than the user.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output-content control device comprising:
    a voice acquiring unit configured to acquire a voice spoken by a user;
    a voice classifying unit configured to calculate a distance between the user and the output-content control device by a proximity sensor to classify the voice into either a first voice or a second voice based on the calculated distance;

an intention analyzing unit configured to analyze the voice acquired by the voice acquiring unit to detect intention information indicating what kind of information is wished to be acquired by the user;

a notification-information acquiring unit configured to acquire notification information which includes content information as a content information to be notified to the user based on the intention information; and an output-content generating unit configured to generate an output sentence as sentence data to be output to the user based on the notification information, wherein the output-content generating unit is further configured to generate, when the voice is determined to be the first voice, a first output sentence in which at least one word selected among words included in the content information of the notification information is replaced with another word, and to generate, when the voice is not determined to be the second voice, a second output sentence which includes all of the intention information and the content information.

2. The output-content control device according to claim 1, wherein the notification information includes type information indicating a type of the content information, and the output-content generating unit is further configured to select, on generating the first output sentence, at least one word to be placed with the other word based on a word included in the content information and the type information that is associated with the content information.

3. The output-content control device according to claim 2, wherein the output-content generating unit is further configured to read, on generating the first output sentence, relationship information including information of a first word that is a predetermined word and a second word that is associated with the first word, and to replace a word included in the notification information with the second word when the word included in the notification information matches with the first word.

4. The output-content control device according to claim 3, wherein the relationship information further includes information of type information indicating a type of the first word, and the output-content generating unit is further configured to select, on generating the first output sentence, a word included in the notification information as word to be replaced with another word when the type information of the word included in the notification information matches with the type information of the first word and the word included in the notification information matches with the first word.

5. The output-content control device according to claim 1, wherein the voice classifying unit is further configured to determine the voice to be the predetermined voice when the voice spoken by the user is a whisper.

6. An output-content control method comprising:

acquiring a voice spoken by a user;

calculating a distance between the user and an output-content control device by a proximity sensor to classify the voice into either a first voice or a second voice based on the calculated distance;

analyzing the acquired voice to detect intention information indicating what kind of information is wished to be acquired by the user;

acquiring notification information which includes content information as a content of information to be notified to the user based on the intention information; and generating, when the voice is determined to be the first voice, a first output sentence in which at least one word selected among words included in the content information of the notification information is replaced with another word; and generating, when the voice is not determined to be the second voice, a second output sentence which includes all of the intention information and the content information.

7. A non-transitory storage medium that stores an output-content control program that causes a computer to execute:

acquiring a voice spoken by a user;

calculating a distance between the user and an output-content control device by a proximity sensor to classify the voice into either a first voice or a second voice based on the calculated distance;

analyzing the acquired voice to detect intention information indicating what kind of information is wished to be acquired by the user;

acquiring notification information which includes content information as a content of information to be notified to the user based on the intention information; and generating, when the voice is determined to be the first voice, a first output sentence in which at least one word selected among words included in the content information of the notification information is replaced with another word; and generating, when the voice is not determined to be the second voice, a second output sentence which includes all of the intention information and the content information.

* * * * *

UNITED STATES PATENT AND TRADEMARK OFFICE
CERTIFICATE OF CORRECTION

PATENT NO. : 11,244,675 B2
APPLICATION NO. : 16/295034
DATED : February 8, 2022
INVENTOR(S) : Naganuma It is certified that error appears in the above-identified patent and that said Letters Patent is hereby corrected as shown below:

In the Claims

In Column 21, Line 17, in Claim 1; in Column 22, Line 25, in Claim 6; in Column 22, Line 47, in Claim 7:
It should read ..."when the voice is determined to be the second voice,"

Signed and Sealed this
Twenty-first Day of May, 2024

Katherine Kelly Vidal
*Director of the United States Patent and Trademark Office*